(12) United States Patent
Cao et al.

(10) Patent No.: US 11,375,728 B2
(45) Date of Patent: Jul. 5, 2022

(54) SYSTEM AND METHOD FOR FINE MANIPULATION

(71) Applicants: TEA RESEARCH INSTITUTE, GUANGDONG ACADEMY OF AGRICULTURAL SCIENCES, Guangdong (CN); CHANGSHA XIANG FENG INTELLIGENT EQUIPMENT LIMITED BY SHARE LTD., Changsha (CN)

(72) Inventors: Junxi Cao, Guangzhou (CN); Aiqing Miao, Guangzhou (CN); Chengying Ma, Guangzhou (CN); Dandan Qi, Guangzhou (CN); Xiaoyan Qiao, Guangzhou (CN); Jinchi Tang, Guangzhou (CN); Wei Chen, Guangzhou (CN); Shi Pang, Guangzhou (CN); Jianyong Zhou, Changsha (CN); Haoming Peng, Changsha (CN)

(73) Assignees: CHANGSHA XIANG FENG INTELLIGENT EQUIPMENT LIMITED BY SHARE LTD., Changsha (CN); TEA RESEARCH INSTITUTE, GUANGDONG ACADEMY OF ARGRICULTURAL SCIENCES, Guangzhou (CN)

( * ) Notice: Subject to any disclaimer, the term of this patent is extended or adjusted under 35 U.S.C. 154(b) by 579 days.

(21) Appl. No.: 16/473,478

(22) PCT Filed: Apr. 28, 2018

(86) PCT No.: PCT/CN2018/085159
§ 371 (c)(1),
(2) Date: Jun. 25, 2019

(87) PCT Pub. No.: WO2019/192045
PCT Pub. Date: Oct. 10, 2019

(65) Prior Publication Data
US 2021/0329936 A1  Oct. 28, 2021

(30) Foreign Application Priority Data
Apr. 2, 2018  (CN) .......................... 201810283901.4

(51) Int. Cl.
*A23F 3/06* (2006.01)
*B65G 15/22* (2006.01)
(Continued)

(52) U.S. Cl.
CPC .............. *A23F 3/06* (2013.01); *B65G 15/22* (2013.01); *B65G 41/007* (2013.01); *B65G 47/80* (2013.01)

(58) Field of Classification Search
None
See application file for complete search history.

(56) References Cited

FOREIGN PATENT DOCUMENTS

| CN | 201163971 Y | 12/2008 |
| CN | 201409422 Y | 2/2010 |

(Continued)

OTHER PUBLICATIONS

International Search Report and Written Opinion, dated Jan. 3, 2019, for International Application No. PCT/CN2018/085159, 5 pages.

(Continued)

*Primary Examiner* — Kavel Singh
(74) *Attorney, Agent, or Firm* — Seed IP Law Group LLP

(57) ABSTRACT

The present disclosure relates to a system and a method for fine manipulation. The system for fine manipulation includes a tossing mechanism, a setting mechanism, and a leaf uniformly distributing mechanism. The tossing mechanism comprises a tossing machine, a leaf distributing assem- (Continued)

bly, a first feeding conveyor assembly, and a first receiving conveyor assembly. The setting mechanism comprises a setting assembly, a second feeding conveyor assembly, and a second receiving conveyor assembly. The setting assembly includes a setting belt and a setting belt driving device configured to drive the setting belt to move. The leaf uniformly distributing mechanism comprises a leaf uniformly distributing device and a lifting driving assembly. The leaf uniformly distributing device includes a shifting arm, a rotary table and a rotary table driving assembly. The lifting driving assembly can drive the leaf uniformly distributing device to move up and down. The system for fine manipulation is convenient to realize uniform distribution of leaves in the tossing machine, and allows alternating between tossing and setting, to realize continuous and automatic fine manipulation for tea leaves. It can significantly reduce labor intensity and improve production efficiency, while improving stability of oolong tea quality.

10 Claims, 5 Drawing Sheets

(51) Int. Cl.
　　*B65G 47/80*　　　(2006.01)
　　*B65G 41/00*　　　(2006.01)

(56) References Cited

FOREIGN PATENT DOCUMENTS

| | | | | |
|---|---|---|---|---|
| CN | 2012-34590 | A | 2/2012 | |
| CN | 202722415 | U | 2/2013 | |
| CN | 204157575 | U | 2/2015 | |
| CN | 105394225 | B | 8/2016 | |
| CN | 205682337 | U | 11/2016 | |
| CN | 107136237 | A | 9/2017 | |
| CN | 108925670 | A * | 12/2018 | ............... A23F 3/12 |
| CN | 109566777 | A * | 4/2019 | |
| JP | 8-84559 | A | 4/1996 | |

OTHER PUBLICATIONS

Yang, "A experimental study on minnan oolong tea and its key process of the continuous production line," M.S Dissertation of Fujian Agriculture and Forestry University, 2014, 96 pages.

Grant Notice and search report of Taiwan Patent Application No. 108110167 dated Sep. 19, 2019; 4 pages.

* cited by examiner

SYSTEM AND METHOD FOR FINE MANIPULATION

TECHNICAL FIELD

The present disclosure relates to the field of tea manufacture equipment, and more particularly, to a system and a method for fine manipulation.

BACKGROUND

The manufacturing technology of oolong tea includes sunning, fine manipulation (also known as "lay leaf", including alternating tossing and setting), fixation, rolling, drying and other processes. The fine manipulation is the most critical procedure for quality formation of the oolong tea, and it is also a procedure with the highest technical level, the highest labor intensity, and the most tedious processes. The fine manipulation procedure of the oolong tea s is mostly carried out at night. The whole fine manipulation procedure generally involves alternating tossing and setting of 6 to 8 times, and there are technical requirements for each time on strength of the tossing, a thickness of a mass of spread leaves during setting, duration of setting, and so on.

At present, the development of the fine manipulation equipment is mainly aimed at the development of special equipment for the tossing process, such as tossing machine. There are two main types of the tossing machines, including a vibration-type tossing machine and a rolling-type tossing machine. The vibration-type tossing machine is divided into a single-screen vibration-type and a trough vibration-type. Although the trough vibration-type tossing machine is convenient for continuous production, it suffers from low tossing efficiency, and it requires a long duration for tossing and produces strong noise if sufficient strength of tossing is guaranteed. The single-screen vibration-type tossing machine suffers from low tossing efficiency as well as labor reliance in loading and unloading leaves and setting, and thus is inconvenient for continuous production. The rolling-type tossing machine is divided into a continuity-rolling type, an integrative fine manipulation machine and an ordinary batch-rolling type. The continuity-rolling type tossing machine is convenient for continuous production, but the tossing duration is uncontrollable, and manual setting is still required. Although the integrative fine manipulation machine can perform fine manipulation automatically, it cannot realize automatic loading and unloading leaves during the fine manipulation. And since the whole fine manipulation process is performed in a tossing cage roller, without loading and unloading leaves during the process, a deep mass of tea leaves is accumulated, the tea leaves extrude each other, and the mass of tea leaves is in a high temperature, so that the processed oolong tea has a low aromatic index, which is unable to reach the level of high quality oolong tea.

For the above-mentioned several types of tossing machines, the ordinary batch-rolling type tossing machine can produce tea with optimum quality, so it is currently the most widely used in the production of the oolong tea. However, the current batch-rolling type tossing machines is low in continuity and automation degree, resulting in low production efficiency. For example, a patent publication document NO. CN107136237A discloses a tossing machine having a revolving door which belongs to the ordinary batch-rolling type tossing machines. When this tossing machine having a revolving door is used for fine manipulation, manual setting is still required, the thickness of the mass of the spread leaves need to be manually adjusted, and the alternating tossing and setting cannot be continuously performed, thereby causing the low production efficiency and the unstable quality of the oolong tea.

SUMMARY

Based on the above, it is necessary to provide a system and a method for fine manipulation, which can realize the continuity of the fine manipulation process and improve the quality stability of oolong tea.

A system for fine manipulation is provided, including:

a tossing mechanism including a tossing machine, a leaf distributing assembly, a first feeding conveyor assembly, and a first receiving conveyor assembly, a leaf distributing belt of the leaf distributing assembly being disposed above the tossing machine and configured to supply tea leaves into the tossing machine, the first feeding conveyor assembly being configured to convey the tea leaves onto the leaf distributing belt, and the first receiving conveyor assembly being disposed below the tossing machine and configured to receive and convey tossed tea leaves;

a setting mechanism includes a setting assembly, a second feeding conveyor assembly, and a second receiving conveyor assembly, the setting assembly including a setting belt and a setting belt driving device configured to drive the setting belt to move, the second feeding conveyor assembly being configured to receive the tossed tea leaves falling from a conveyor belt of the first receiving conveyor assembly and convey them to the setting belt, and the second receiving conveyor assembly being configured to receive the set tea leaves falling from the setting belt and convey them to a conveyor belt of the first feeding conveyor assembly; and a leaf uniformly distributing mechanism including a leaf uniformly distributing device and a lifting driving assembly, the leaf uniformly distributing device including a shifting arm, a rotary table and a rotary table driving assembly, the shifting arm being disposed on the rotary table, the rotary table being disposed on the rotary table driving assembly and drivable by the rotary table driving assembly to move so as to drive the shifting arm to move, the lifting driving assembly being able to drive the leaf uniformly distributing device to move up and down, and the leaf uniformly distributing device being configured to be disposed above the setting belt.

In an embodiment, the rotary table is provided with a plurality of shifting arms, and the shifting arms are evenly arranged along an outer periphery of the rotary table.

In an embodiment, a rotating shaft of the rotary table driving assembly is sleeved with a plurality of leaf uniformly distributing devices, and the leaf uniformly distributing devices are evenly arranged along a width direction of the setting belt.

In an embodiment, the leaf uniformly distributing device further includes a mounting cover, the lifting driving assembly is disposed within the mounting cover, and the mounting cover is movably disposed on a top of a frame of the setting mechanism.

The lifting driving assembly includes two lifting screw rods, a transmission belt, a driving wheel, two driven wheels, and a transmission belt driving device. The transmission belt driving device is connected to the driving wheel and configured to drive the driving wheel to rotate. The transmission belt is sleeved on the driving wheel and the two driven wheels. The two driven wheels are in threaded connection with the two lifting screw rods respectively.

Two ends of the rotating shaft of the rotary table driving assembly are connected to the two lifting screw rods respectively.

In an embodiment, a plurality of setting belts is provided, and the plurality of the setting belts is sequentially staggered arranged in a vertical direction to form a multi-layer setting structure.

A plurality of setting belt driving devices is provided, and the plurality of the setting belt driving devices is arranged in one-to-one correspondence with the setting belts.

In an embodiment, the tossing mechanism further includes a housing.

The housing has a receiving cavity, a top of the housing is provided with a feeding port communicating with the receiving cavity, a bottom of the housing is provided with a discharging hole in an inverted tapered structure. The housing is further provided with a leaf distributing track.

The leaf distributing assembly includes a first frame body, the leaf distributing belt, a leaf distributing belt driving assembly and a first frame body driving assembly. The leaf distributing belt driving assembly is disposed on the first frame body and configured to drive the leaf distributing belt to move. The first frame body driving assembly is configured to drive the first frame body to move back and forth along the leaf distributing track.

In an embodiment, two setting mechanisms are provided, and the two setting mechanisms are respectively arranged to be close to the two ends of the tossing machine.

The system for fine manipulation further includes a leaf dividing conveyor mechanism. The leaf dividing conveyor mechanism includes a connecting track, a second frame body, a leaf dividing belt, a leaf dividing belt driving assembly and a second frame body driving assembly, which are arranged on top of frames of the two setting mechanisms. The leaf dividing belt is configured to receive tea leaves falling from a conveyor belt of the second feeding conveyor assembly and convey the tea leaves to the setting belt of each of the two setting mechanisms. The leaf dividing belt driving assembly is disposed on the second frame body and configured to drive the leaf dividing belt to move. The second frame body driving assembly is configured to drive the second frame body to move back and forth along the connecting track.

In an embodiment, the system for fine manipulation further includes a light supplying system configured to provide illumination to tea leaves on the setting belt, and an air blowing system configured to blow air to the tea leaves on the setting belt.

In an embodiment, the system for fine manipulation further includes a control system configured to control respective driving devices of the tossing mechanism, the setting mechanism and the leaf uniformly distributing mechanism to operate separately.

A method for fine manipulation tea is also provided, by which the above-mentioned system for fine manipulation is used. The method includes the following steps:

S1: activating the tossing mechanism, making an inlet and outlet port of the tossing machine face upwards and open, conveying sunned tea leaves into the tossing machine through the first feeding conveyor assembly, closing the inlet and outlet port, and performing a first tossing;

S2: activating the setting mechanism and the leaf uniformly distributing mechanism after the first tossing is finished, making the inlet and outlet port of the tossing machine face downwards and open, conveying firstly tossed tea leaves to the conveyor belt of the second feeding conveyor assembly and to the setting belt of the setting mechanism, distributing the firstly tossed tea leaves uniformly by the leaf uniformly distributing device, and performing a first setting;

S3: conveying set tea leaves from the setting belt to the conveyor belt of the first receiving conveyor assembly after the first setting is finished, and conveying the set tea leaves to the conveyor belt of the first feeding conveyor assembly and into the tossing machine; and performing a next tossing and a next setting in accordance with steps S1 and S2 sequentially, and performing a cycle of these steps repeatedly until the fine manipulation is finished.

The above-mentioned system for fine manipulation includes a tossing mechanism, a setting mechanism and a leaf uniformly distributing mechanism arranged in cooperation with each other. The system for fine manipulation is convenient to realize uniform distribution of leaves in the tossing machine, and it can realize alternating between the tossing and the setting and is convenient to uniformly adjust the process parameters such as the thickness of the mass of the spread leaves during the setting, and the duration of the setting, to avoid the problem of different judgment standards when manually judging the processing quality, thereby realizing the continuity and automaticity of fine manipulation. It can significantly reduce labor intensity and improve production efficiency, and improve the stability of oolong tea quality at the same time. Further, the above-mentioned system for fine manipulation can control the moisture of the green tea raw materials through the tossing machine, and can also realize the sunning process by installing a light supplying system and an air blowing system in the workshop or on the setting mechanism, in order to further improve the processing efficiency of tea, such as oolong tea.

DETAILED DESCRIPTION OF EMBODIMENTS

Figure 1:
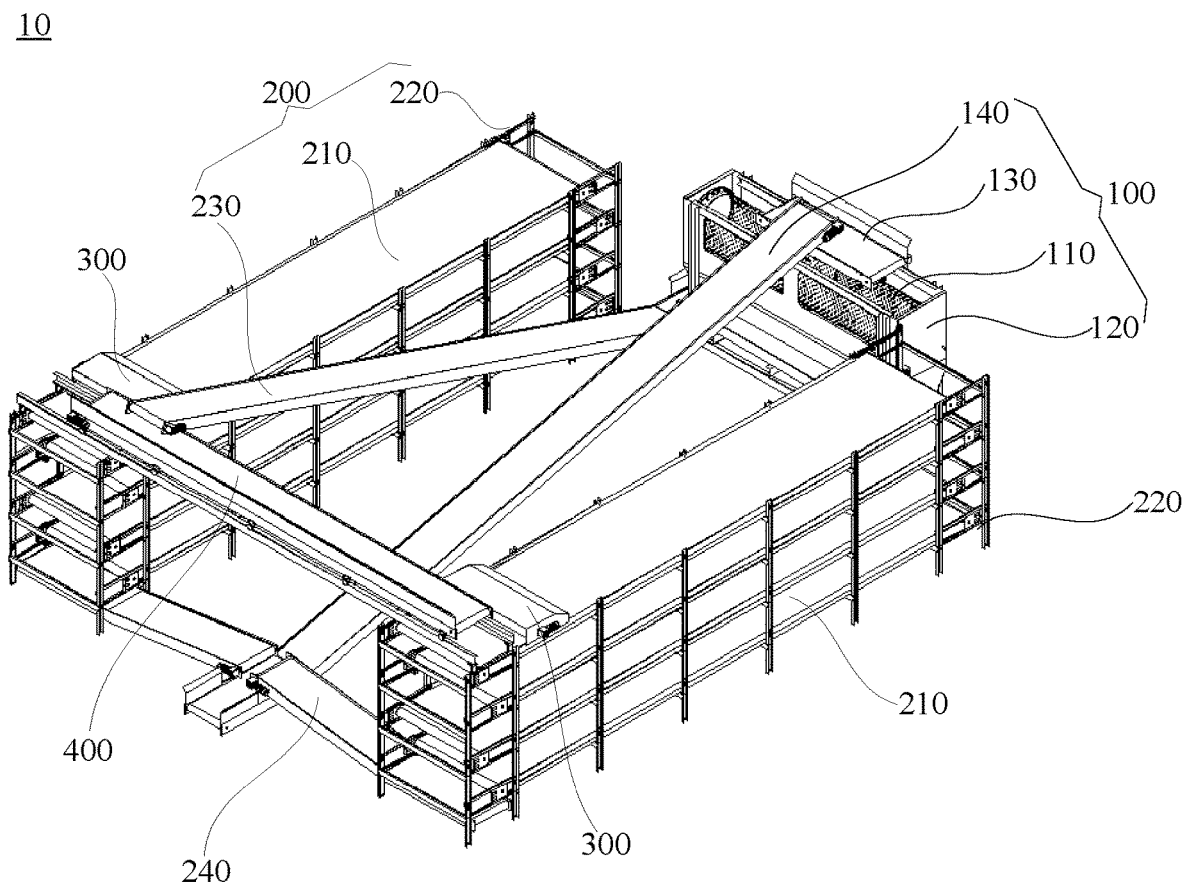
FIG. 1 is a schematic diagram illustrating a main structure of a system for fine manipulation according to one embodiment viewed from an angle.
Figure 2:
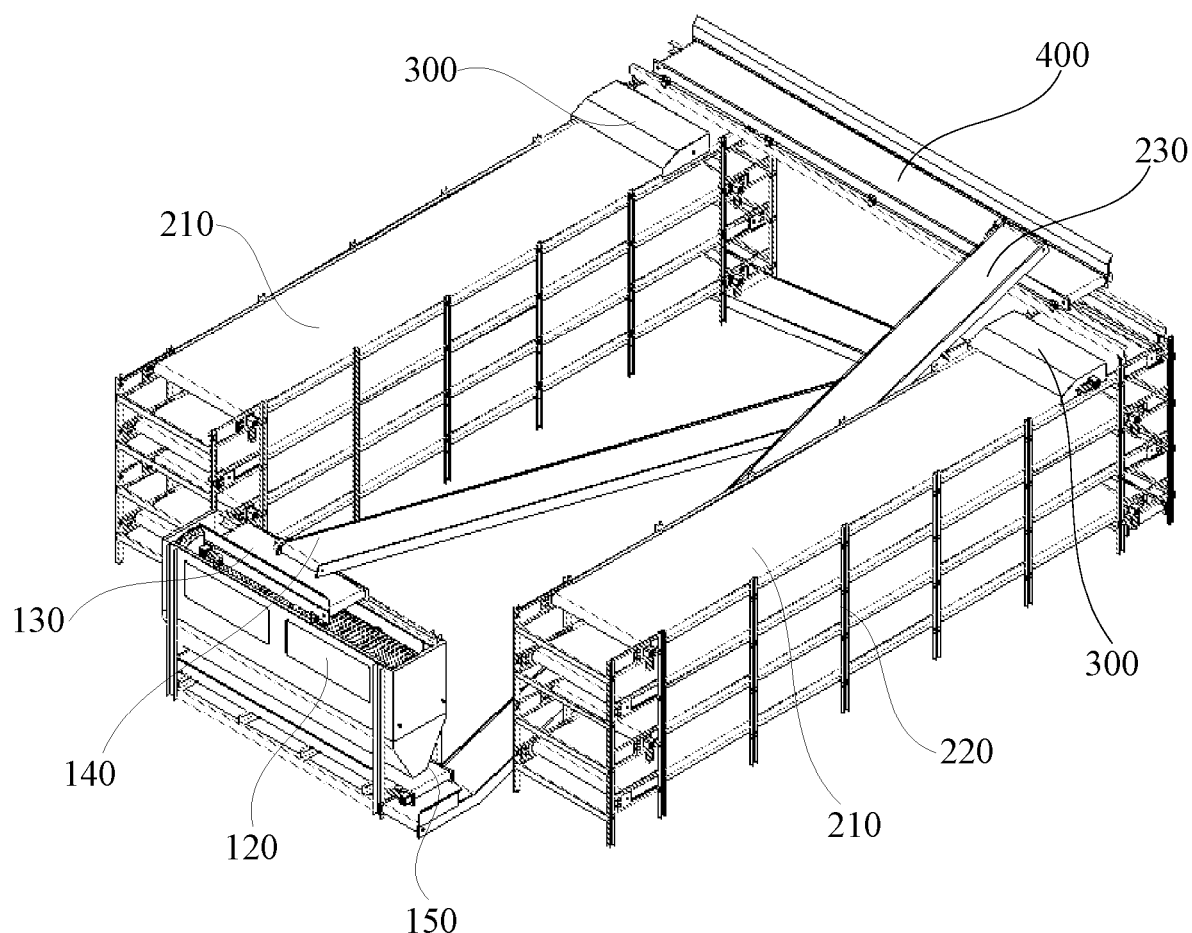
FIG. 2 is a schematic diagram illustrating the main structure of the system for fine manipulation in FIG. 1 viewed from another angle.
Figure 3:
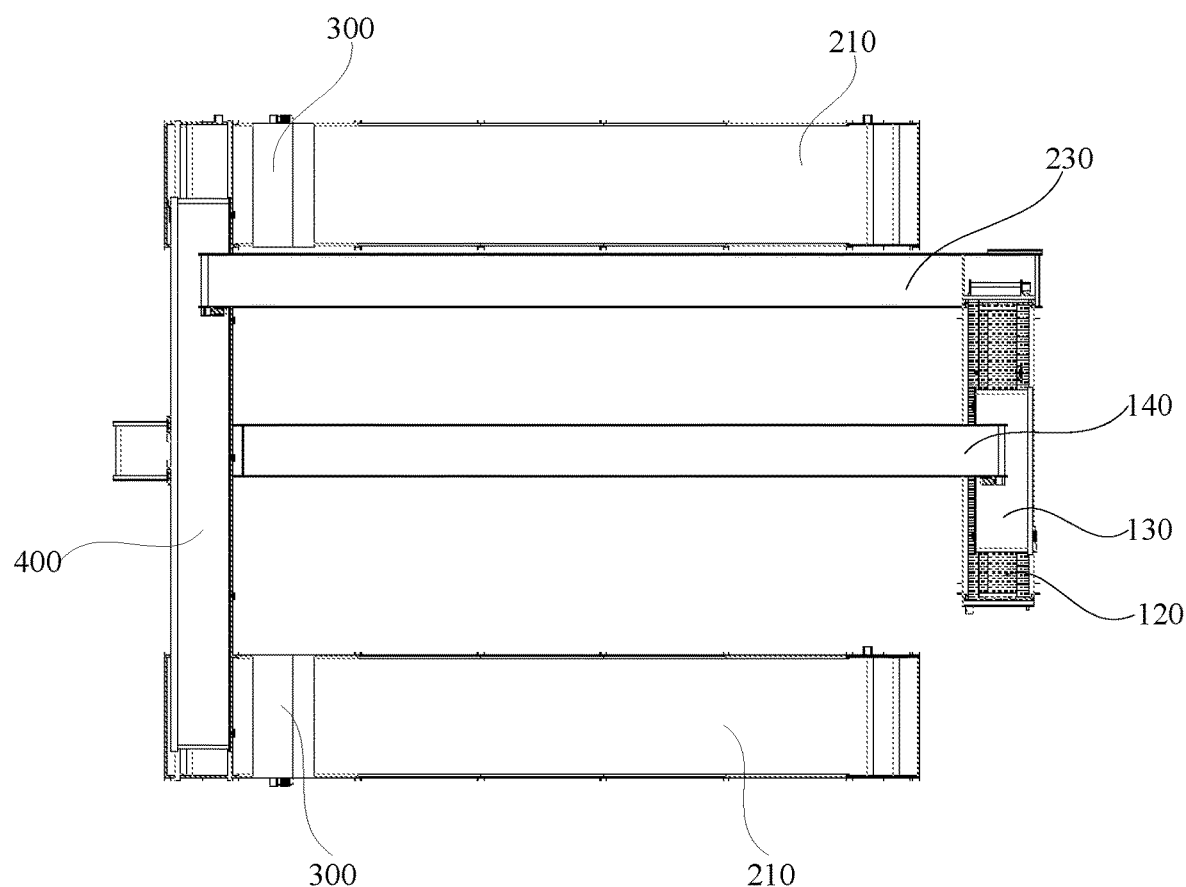
FIG. 3 is a top view of the system for fine manipulation in FIG. 1.
Figure 4:
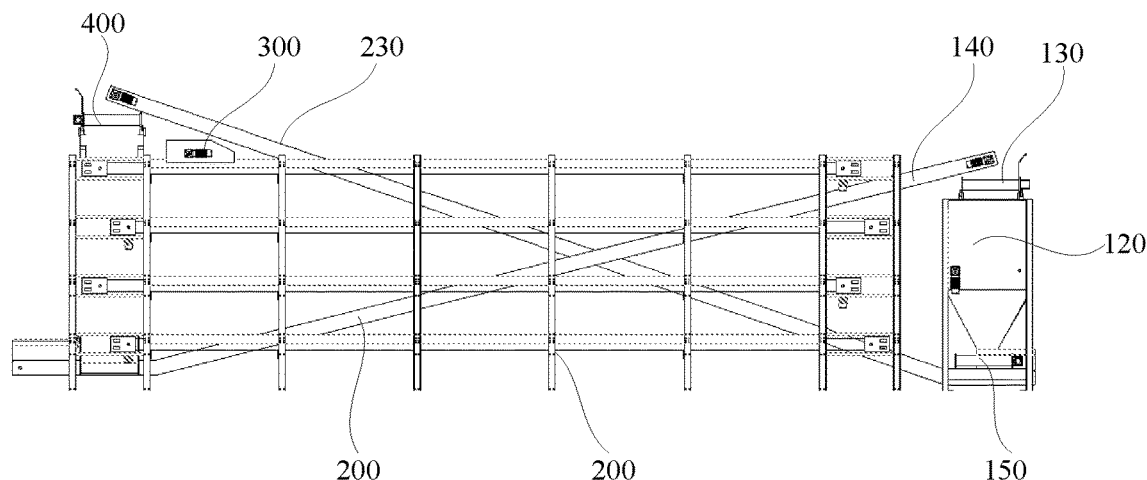
FIG. 4 is a schematic diagram illustrating the system for fine manipulation in FIG. 1 viewed from a further angle.

Illustrative embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It should be understood that when an element is herein referred to as being "on" another element, it can be directly on the other element or an intervening element may be present. When an element is herein referred to as being "connected" to another element, it can be directly connected to the other element or an intervening element may be present.

Unless otherwise specified, all terms (including technical and scientific terms) used herein have the same meaning as commonly understood by those skilled in the art to which this disclosure belongs. The terms used herein is for the purpose of describing embodiments only and is not intended to limit the present disclosure. As used herein, the term "and/or" includes any and all combinations of one or more of the associated listed items.

Referring to FIG. 1 to FIG. 4, a system for fine manipulation 10 according to one embodiment includes a tossing mechanism 100, a setting mechanism 200 and a leaf uniformly distributing mechanism 300.

In this embodiment, the tossing mechanism 100 includes a tossing machine 110, a leaf distributing assembly 130, a first feeding conveyor assembly 140, and a first receiving conveyor assembly 150. A leaf distributing belt of the leaf distributing assembly 130 is disposed above the tossing machine 110 and configured to supply tea leaves into the tossing machine 110. The first feeding conveyor assembly 140 is configured to convey the tea leaves onto the leaf distributing belt. The first receiving conveyor assembly 150 is disposed below the tossing machine 110 and configured to receive and convey the tossed tea leaves.

In an embodiment, the main structure of the tossing machine 110 may be a tossing machine 110 having a rotating door, which is described in Chinese Patent Application Publication NO. CN107136237A. The tossing machine 110 includes a rack, a tossing cage, a rotating door, a locking assembly, a drive and control mechanism, and so on. When the tossing of tea leaves is performed by using this tossing machine 110, the automatic opening and closing of the rotating door can be realized by cooperation between an electromagnetic switch and an elastic bead lock. It is convenient to control an inlet and outlet port to face upwards or downwards for loading or unloading, and the inlet and outlet port can be closed by the rotating door to perform the tossing. In other embodiments, the tossing machine 110 may be batch-rolling type of other configuration, as long as automatic loading and unloading can be realized.

Figure 5:
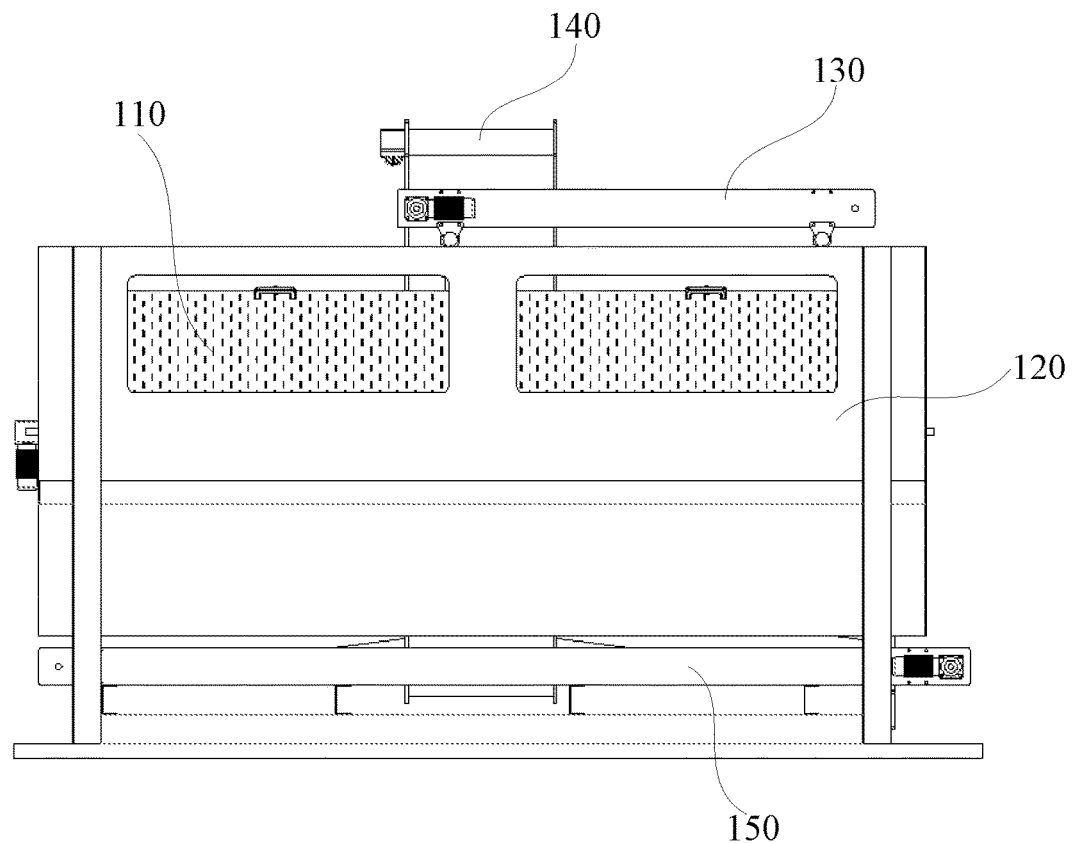
FIG. 5 is a schematic diagram illustrating a tossing mechanism of the system for fine manipulation in FIG. 1 viewed from an angle.

Further referring to FIG. 5, in this embodiment, specifically, the leaf distributing assembly 130 includes a first frame body, a leaf distributing belt, a leaf distributing belt driving assembly and a first frame body driving assembly. The first frame body is a frame structure. The leaf distributing belt driving assembly includes a driving motor and a driving rod, and the leaf distributing belt is disposed on the driving rod. The leaf distributing belt driving assembly is disposed on the first frame body and configured to drive the leaf distributing belt to move, thereby, the tea leaves on the leaf distributing belt are conveyed and automatically fall into the tossing machine 110. The first frame body driving assembly is configured to drive the first frame body to move back and forth along the leaf distributing track by the forward and reverse rotation of a motor, thereby facilitating to uniformly distribute the tea leaves into the tossing machine 110. Further, the first frame body has a retaining plate along a side of a long edge of the first frame body, and the retaining plate has a height adapted to a height at which a tilted conveyor belt of the first feeding conveyor assembly 140 is disposed, to prevent the tea leaves from being scattered to an area other than the leaf distributing belt. When the tossing machine 110 is provided with two elongated inlet and outlet ports, a traveling range of the first frame body on the leaf distributing track and the rotation direction of the leaf distributing belt can be controlled, and one of the inlet and outlet ports can be controlled to be uniformly fed.

Further, the tossing mechanism 100 further includes a housing 120. The housing 120 has a receiving cavity, the main body structure of the tossing machine 110 is disposed within the receiving cavity. The top of the housing 120 is provided with a feeding port communicating with the receiving cavity. The bottom of the housing 120 is provided with a discharging hole in an inverted tapered structure which is convenient to concentrate the tea leaves falling from the tossing machine 110 so as to prevent the tea leaves from being scattered to an area other than the conveyor belt of the first receiving conveyor assembly. A window is provided on a side wall of the housing 120 to facilitate observation of the operation condition of the tossing cage and the like. A top wall of the housing 120 is further provided with a leaf distributing track, a bottom of the first frame body is provided with wheels adapted to the leaf distributing track, so that the leaf distributing assembly 130 can move back and forth along the leaf distributing track, thereby facilitating to uniformly distribute the tea leaves into the tossing machine 110.

In an embodiment, the first feeding conveyor assembly 140 includes a support frame, a tossing feeding conveyor belt, and a driving device for driving the tossing feeding conveyor belt to move. The driving device for driving the tossing feeding conveyor belt to move is disposed on the support frame. The first feeding conveyor assembly 140 includes a horizontal, straight conveying portion for receiving the tea leaves and an inclined upward conveying portion for conveying the tea leaves into the tossing machine 110. In addition, the driving device for driving the tossing feeding conveyor belt to move may be a driving motor capable of forward and reverse rotation, thereby driving the tossing feeding conveyor belt to move forward and reverse, to facilitate the unloading and collecting of the tea leaves from the whole system after the process of the fine manipulation stops or the fine manipulation is finished.

The first receiving conveyor assembly 150 includes a support frame, a tossing receiving conveyor belt, and a driving device for driving the tossing receiving conveyor belt to move. The driving device for driving the tossing receiving conveyor belt to move is disposed on the support frame. The tossing receiving conveyor belt is entirely below the tossing cage, and configured to horizontally and straightly convey the tossed tea leaves to the conveyor belt of the second feeding conveyor assembly 230. In addition, the driving device for driving the tossing receiving conveyor belt to move may be a driving motor capable of forward and reverse rotation, thereby driving the tossing receiving conveyor belt to move forward and reverse, to facilitating the unloading and collecting of the tea leaves from the whole system after the process of the fine manipulation stops or the fine manipulation is finished.

In this embodiment, the setting mechanism 200 includes a setting assembly, a second feeding conveyor assembly 230, and a second receiving conveyor assembly 240. The setting assembly includes a setting frame 220, a setting belt 210 and a setting belt driving device configured to drive the setting belt 210 to move. The setting belt 210 and the setting belt driving device are disposed on the setting frame 220. The second feeding conveyor assembly 230 is configured to receive the tossed tea leaves falling from the conveyor belt of the first receiving conveyor assembly 150 and convey them to the setting belt 210. The second receiving conveyor assembly 240 is configured to receive the set tea leaves falling from the setting belt 210 and convey them to the conveyor belt of the first feeding conveyor assembly 140.

Preferably, each setting assembly 200 has four setting belts arranged in a sequentially staggered arrangement in a vertical direction to form a four-layer setting structure. The staggered arrangement means that both ends of the upper layer of the setting belts 210 are offset from the both ends of the lower layer of the setting belts 210, which facilitate automatic fall of the tea leaves from the upper layer of the setting belts 210 to the lower layer of the setting belts 210 during the conveying process. A plurality of setting belt driving devices are provided, and the setting belt driving devices are arranged in one-to-one correspondence with the setting belts, thereby facilitating the individual control of each layer of the setting structure as required during the setting process.

In other embodiments, the number of the setting belt can be set, for example, one, two or five according to the space structure of the workshop and the production demand of the tea leaves. A plurality of setting belts 210 is arranged in a sequentially staggered arrangement in the vertical direction to form a four-layer setting structure. Correspondingly, a plurality of setting belt driving devices is provided, and the setting belt driving devices are arranged in one-to-one correspondence with the setting belts, thereby facilitating the individual control of each layer of the airing structure as required during the airing process, so as to satisfy the requirements such as a thickness of a mass of spread leaves during setting and the duration of setting as much as possible.

In this embodiment, in order to improve the processing efficiency of the tea leaves, two setting mechanisms are provided, and the two setting mechanisms are respectively arranged to be close to the two ends of the tossing mechanism. In other embodiments, the number of the setting mechanism is not limited to two, and may be three, five or others.

Figure 6:
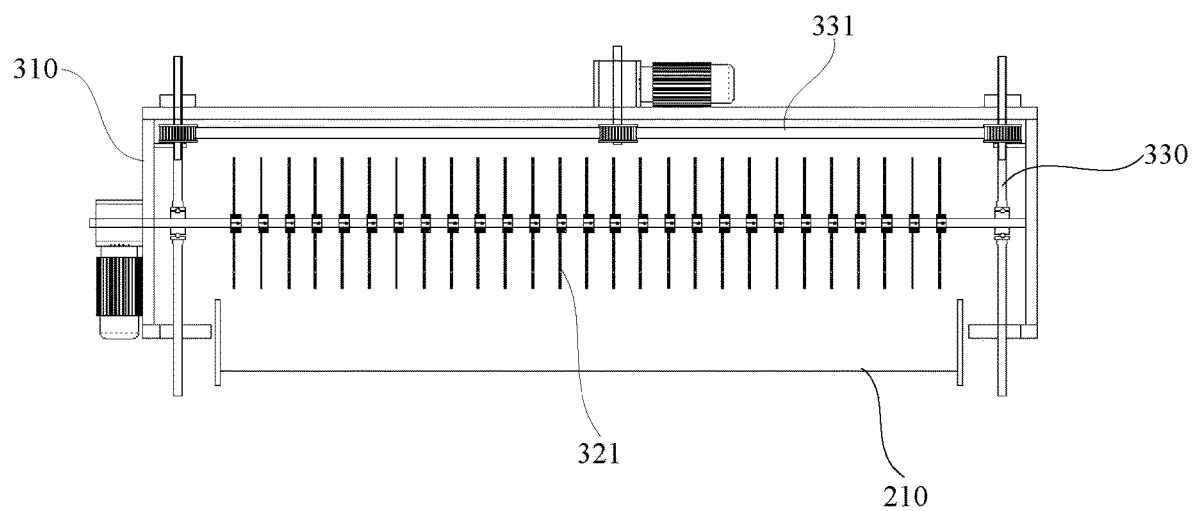
FIG. 6 is a schematic diagram illustrating a leaf uniformly distributing mechanism of the system for fine manipulation in FIG. 1 viewed from an angle.
Figure 7:
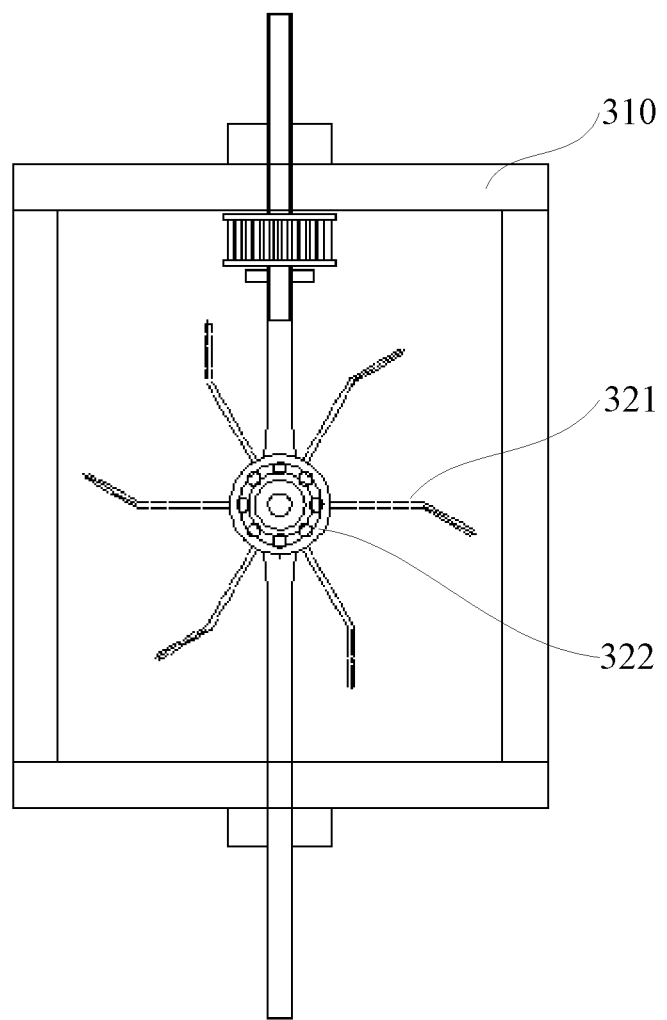
FIG. 7 is a schematic diagram illustrating the leaf uniformly distributing mechanism in FIG. 6 viewed from another angle.

Referring to FIG. 6 and FIG. 7, in this embodiment, the leaf uniformly distributing mechanism 300 includes a leaf uniformly distributing device and a lifting driving assembly. The leaf uniformly distributing device is disposed above the setting belt 210, so as to dilute tea leaves on the setting belt 210. The lifting driving assembly can drive the leaf uniformly distributing device to move up and down, so as to further control the thickness of the spread leaves during the setting process and ensure the quality of the processed tea leaves.

Specifically, the leaf uniformly distributing device includes a shifting arm 321, a rotary table 322 and a rotary table driving assembly. The shifting arm 321 is disposed on the rotary table 322, and the rotary table 322 is disposed on the rotary table driving assembly and drivable by the rotary table driving assembly to move so as to drive the shifting arm 321 to move. The shifting arm 321 is preferably made of a silicone material, and it has a certain soft elasticity and can be formed into a bending mechanism as a whole, to improve the shifting efficiency.

In an embodiment, each rotary table 322 is provided with a plurality of shifting arms evenly arranged along an outer periphery of the rotary table 322. A rotating shaft of the rotary table driving assembly may be sleeved with one or more leaf uniformly distributing devices. The leaf uniformly distributing devices are evenly arranged along a width direction of the setting belt 210, in order to further improve the thickness uniformity of the spread leaves during the setting process, thereby ensuring the stability of the tea quality.

In an embodiment, the lifting driving assembly includes two lifting screw rods 330, a transmission belt 331, a driving wheel, two driven wheels and a transmission belt driving device. The transmission belt driving device may be a servo motor capable of forward and reverse rotation, connected to the driving wheel and configured to drive the driving wheel to move. The transmission belt 331 is sleeved on the driving wheel and the two driven wheels. The two driven wheels are in threaded connection with the two lifting screw rods respectively 330, thereby facilitating controlling the height of the leaf uniformly distributing device. Two ends of the rotating shaft of the rotary table driving assembly are respectively connected to the two lifting screw rods 330, so that the lifting of the leaf uniformly distributing device can be controlled by the forward and reverse rotation of the transmission belt driving device (servo motor), and the thickness of the spread leaves during the setting process can be effectively regulated by precisely controlling the lifting height of the leaf uniformly distributing device.

Further, the leaf uniformly distributing device further includes a mounting cover 310. The lifting driving assembly is disposed within the mounting cover 310. A bottom of the mounting cover 310 is provided with wheels so that the mounting cover 310 is movably disposed on a top of the setting frame 220 of the setting mechanism 200, which is convenient to move back and forth on the top of the setting frame 220 of the setting mechanism 200.

Further, the system for fine manipulation 10 further includes a leaf dividing conveyor mechanism 400. A leaf dividing belt is configured to receive tea leaves falling from the conveyor belt of the second feeding conveyor assembly 230 and convey them to the setting belts 210 of the two setting mechanisms respectively. A leaf dividing belt driving assembly is disposed on a second frame body and configured to drive the leaf dividing belt to move. A second frame body driving assembly is configured to drive the second frame body to move back and forth along a connecting track by the forward and reverse rotation of the driving motor. According to the using condition of the setting mechanism 200, the traveling range of the second frame body on the connecting track and the rotation direction of the leaf dividing belt can be controlled, and the tea leaves are controlled to be conveyed to one of the setting mechanisms 200.

Specifically, the leaf dividing conveyor mechanism 400 includes a connecting track, a second frame body, a leaf dividing belt, a leaf dividing belt driving assembly and a second frame body driving assembly, which are arranged on top of frames of the two setting mechanisms 200. The second frame body is a frame structure. The leaf dividing belt driving assembly includes a driving motor and a driving rod, the leaf dividing belt is disposed on the driving rod. The leaf dividing belt driving assembly is disposed on the second frame body and configured to drive the leaf dividing belt to move, thereby, the tea leaves on the leaf dividing belt are conveyed and automatically fall onto the setting belt 210. The second frame body driving assembly is configured to drive the second frame body to move back and forth along the connecting track, thereby facilitating to distributing the tea leaves onto the setting belt 210 uniformly. Further, the second frame body has a retaining plate along the side of the long edge of the second frame body, and the retaining plate has a height adapted to a height at which a tilted conveyor belt of the second feeding conveyor assembly 230 is disposed, to prevent the tea leaves from being scattered to an area other than the leaf dividing belt.

In this embodiment, the system for fine manipulation 10 further includes a control system. The control system is electrically connected to driving devices such as driving motors in the tossing machine 110, the tossing mechanism 100, the setting mechanism 200, and the leaf uniformly distributing mechanism 300. The parameters such as tossing cage rotating speed, the tossing duration, the rotation speed of all the conveyor belts, the traveling direction and traveling speed of the first frame body, the traveling direction and traveling speed of the second frame body, the height of the leaf uniformly distributing device, and the opening, suspension and working duration of each mechanism can be controlled by the control system. All technical processes and processing parameters can be set by a controller in the control system, such as whether to carry out sunning, the duration of the sunning, the duration of the setting, the strength of the tossing, the duration of the tossing and the times of the tossing, etc., so that the whole equipment realizes automatic intelligent processes of the sunning and fine manipulation according to the pre-input method. The running phase can be displayed and the parameters of the next phase can be adjusted during the running of the program. Of course, it can be understood that the control system can also control the respective driving devices of the tossing mechanism 100, the setting mechanism 200, the leaf uniformly distributing mechanism 300, and the leaf dividing conveyor mechanism 400 to operate separately.

In addition, further, the system for fine manipulation 10 further includes a light supplying system configured to provide illumination to tea leaves on the setting belts 210, and an air blowing system configured to blow air to the tea leaves on the setting belts 210. The light supplying system can be disposed on the setting frame 220 of the setting mechanism 200 and located above each setting belt 210. The air blowing system includes a ventilating duct and a blower. The ventilating duct is disposed on the setting frame 220 of the setting mechanism 200, and is arranged and controlled separately to correspond to each setting belt 210.

The system for fine manipulation 10 according to the present disclosure includes a tossing mechanism 100, a setting mechanism 200 and a leaf uniformly distributing mechanism 300 which are arranged in cooperation with each other. The system for fine manipulation is convenient to realize uniform distribution of leaves in the tossing machine 110 and on the setting belt 210, and it can realize alternating between the tossing and the setting and is convenient to uniformly adjust the process parameters such as the thickness of the mass of the spread leaves during the setting, and the duration of setting, to avoid the problem of different judgment standards when manually judging the processing quality, thereby realizing the continuity and automaticity of fine manipulation. It can significantly reduce labor intensity and improve production efficiency, and improve the stability of oolong tea quality at the same time. Further, the above-mentioned system for fine manipulation 10 can control the moisture of the green tea raw material through the tossing machine 110, and can also realize the sunning process by installing a light supplying system and an air blowing system in the workshop or on the setting mechanism 200, in order to further improve the processing efficiency of tea, such as oolong tea.

In this embodiment, a method for fine manipulation by using the system for fine manipulation 10 is provided, including the following steps:

S1: under the control of the control system, activating the tossing mechanism 100, making the inlet and outlet port of the tossing machine 110 face upwards and open, conveying sunned tea leaves into the leaf distributing belt of the leaf distributing assembly 130 through the first feeding conveyor assembly 140, driving the first frame body to move back and forth so the tea leaves on the leaf distributing belt evenly fall into the tossing machine 110, closing the inlet and outlet port, and performing a first tossing;

S2: activating the setting mechanism 200, the leaf distributing mechanism 400 and the leaf uniformly distributing mechanism 300 after the first tossing is finished, making the inlet and outlet port of the tossing machine 110 face downwards and open so that firstly tossed tea leaves fall onto the conveyor belt of the first receiving conveyor assembly 150, conveying the firstly tossed tea leaves to the conveyor belt of the second feeding conveyor assembly 230 and to the setting belt 210 at a top layer of the setting mechanism 200, distributing the firstly tossed tea leaves uniformly by the leaf uniformly distributing device, conveying the uniformly distributed tea leaves to the setting belt 210 at a middle layer of the setting mechanism 200 and the setting belt 210 at a bottom layer of the setting mechanism 200 sequentially, and performing a first setting;

S3: conveying set tea leaves on the setting belt 210 to the conveyor belt of the first receiving conveyor assembly 240 after the first setting is finished, and conveying the set tea leaves to the conveyor belt of the first feeding conveyor assembly 140 and into the tossing machine 110; and performing a next tossing and a next setting in accordance with steps S1 and S2 sequentially, and performing a cycle of these steps repeatedly until the fine manipulation is finished.

In addition, the fine manipulating system 10 according to the present embodiment may also be used for sunning of the tea leaves before the fine manipulation. The process of sunning is described as below.

The tea leaves (i.e., green tea raw material) are conveyed to the leaf distributing belt of the leaf distributing conveyor mechanism 400 through the conveyor belt of the second feeding conveyor assembly 230, then conveyed onto the setting belt 210 at the top layer of the setting mechanism 200 through the leaf distributing belt, and then uniformly distributed by the leaf uniformly distributing device. The uniformly distributed tea leaves are conveyed onto the setting belts 210 at the middle layer and the bottom layer of the setting mechanism 200 sequentially. The light supplying system and the air blowing system are activated, and the sunning is performed.

After the sunning is finished, the fine manipulation is performed to the sunned tea leaves according to the above-mentioned steps, thereby realizing the continuous processing of sunning and fine manipulation, and significantly improving the automation production efficiency.

For example, when the system for fine manipulation 10 according to this embodiment performs the processes of sunning and fine manipulation, the processing parameters for processing control are described as follows.

The processes of sunning and setting for reviving: performing sunning process for 20-30 minutes, and then performing setting for reviving for 1 hour, with a thickness of a mass of spread leaves of 3-7 cm.

The first cycle of tossing and setting: rotating the tossing cage by 1 turn (time unit and rotation speed of the tossing cage can also be used to control), and performing the setting for 45 minutes, with a thickness of a mass of spread leaves of 5-10 cm.

The second cycle of tossing and setting: rotating the tossing cage by 2 turns, and performing the setting for 55 minutes, with a thickness of a mass of spread leaves of 5-10 cm.

The third cycle of tossing and setting: rotating the tossing cage by 4 turns, and performing the setting for 65 minutes, with a thickness of a mass of spread leaves of 5-10 cm.

The fourth cycle of tossing and setting: rotating the tossing cage by 8 turns, and performing the setting for 75 minutes, with a thickness of a mass of spread leaves of 5-10 cm.

The fifth cycle of tossing and setting: rotating the tossing cage by 16 turns, and performing the setting for 90 minutes, with a thickness of a mass of spread leaves of 8-12 cm.

The sixth cycle of tossing and setting: rotating the tossing cage by 32 turns, and performing the setting for 120 minutes, with a thickness of a mass of spread leaves of 8-12 cm.

The seventh cycle of tossing and setting: rotating the tossing cage by 64 turns, and performing the setting for 150 minutes, with a thickness of a mass of spread leaves of 10-15 cm.

The eighth cycle of tossing and setting: rotating the tossing cage by 128 turns, and performing the setting for 150 minutes, with a thickness of a mass of spread leaves of 10-15 cm.

The ninth cycle of tossing and setting: rotating the tossing cage by 15 minutes, and performing the setting for 150 minutes, with a thickness of a mass of spread leaves of 25-30 cm.

That is, in the process of fine manipulation with the system for fine manipulation 10 according to this embodiment, the conveying speed of the tea leaves, the strength of the tossing, the duration of the tossing, the duration of the sunning and the thickness of the mass of the spread leaves in each step can be controlled by the control system as required, thereby realizing the continuous processing of sunning and fine manipulation, and obtaining high quality oolong tea.

In addition, when the green tea raw materials are picked in rainy day, before the process of sunning, a pre-drying process of the green tea raw materials may be performed by the system for fine manipulation 10, which includes the following steps.

The green tea raw materials are conveyed to the leaf distributing belt of the leaf distributing assembly 130 through the conveyor belt of the first feeding conveyor assembly 140, and distributed into the tossing machine 110. A brief tossing is performed by the tossing machine 110, so that some of moisture on the green tea raw materials is removed by the centripetal force. The green tea raw materials with some of moisture pre-removed are conveyed to the setting belt 210 through the first receiving conveyor assembly 150, the second feeding conveyor assembly 230 and the leaf distributing conveyor mechanism 400, and the sunning process is performed.

The technical features of the above-described embodiments may be combined arbitrarily. For brevity, not all the possible combinations of the technical features in the above-described embodiments are described. However, as long as there is no conflict between the technical features of the embodiments in other possible combinations, such combinations are within the scope of this specification.

The above-described embodiments are merely some embodiments of the present disclosure, which are specifically and thoroughly described. However, it should not be understood as limiting the scope of the present disclosure. It should be noted that those skilled in the art may make some variations and improvements without departing from the concept of the present disclosure, and the variations and improvements shall fall within the protection scope of the present disclosure. Therefore, the protection scope of the present disclosure shall be subject to the appended claims.

What is claimed is:

1. A system for fine manipulation, comprising:
a tossing mechanism comprising a tossing machine, a leaf distributing assembly, a first feeding conveyor assembly, and a first receiving conveyor assembly, wherein a leaf distributing belt of the leaf distributing assembly is disposed above the tossing machine and configured to supply tea leaves into the tossing machine, the first feeding conveyor assembly is configured to convey the tea leaves onto the leaf distributing belt, and the first receiving conveyor assembly is disposed below the tossing machine and configured to receive and convey tossed tea leaves;
a setting mechanism comprising a setting assembly, a second feeding conveyor assembly, and a second receiving conveyor assembly, wherein the setting assembly comprises a setting belt and a setting belt driving device configured to drive the setting belt to move, the second feeding conveyor assembly is configured to receive the tossed tea leaves falling from a conveyor belt of the first receiving conveyor assembly and convey them to the setting belt, and the second receiving conveyor assembly is configured to receive set tea leaves falling from the setting belt and convey them to a conveyor belt of the first feeding conveyor assembly; and
a leaf uniformly distributing mechanism comprising a leaf uniformly distributing device and a lifting driving assembly, wherein the leaf uniformly distributing device comprises a shifting arm, a rotary table and a rotary table driving assembly, the shifting arm is disposed on the rotary table, the rotary table is disposed on the rotary table driving assembly and drivable by the rotary table driving assembly to move so as to drive the shifting arm to move, the lifting driving assembly is able to drive the leaf uniformly distributing device to move up and down, and the leaf uniformly distributing device is configured to be disposed above the setting belt.

2. The system for fine manipulation according to claim 1, wherein the rotary table is provided with a plurality of shifting arms, and the plurality of shifting arms are evenly arranged along an outer periphery of the rotary table.

3. The system for fine manipulation according to claim 2, wherein a rotating shaft of the rotary table driving assembly is sleeved with a plurality of leaf uniformly distributing devices, and the plurality of leaf uniformly distributing devices are evenly arranged along a width direction of the setting belt.

4. The system for fine manipulation according to claim 3, wherein: the leaf uniformly distributing device further comprises a mounting cover, the lifting driving assembly is disposed within the mounting cover, and the mounting cover is movably disposed on a top of a frame of the setting mechanism;
the lifting driving assembly comprises two lifting screw rods, a transmission belt, a driving wheel, two driven wheels, and a transmission belt driving device, the transmission belt driving device is connected to the driving wheel and configured to drive the driving wheel to rotate, the transmission belt is sleeved on the driving wheel and the two driven wheels, and the two driven wheels are in threaded connection with the two lifting screw rods respectively; and two ends of the rotating shaft of the rotary table driving assembly are connected to the two lifting screw rods respectively.

5. The system for fine manipulation according to claim 1, wherein: a plurality of setting belts is provided, and the plurality of setting belts is sequentially staggered arranged in a vertical direction to form a multi-layer setting structure; and a plurality of setting belt driving devices is provided, and the plurality of setting belt driving devices is arranged in one-to-one correspondence with the setting belts.

6. The system for fine manipulation according to claim 1, wherein: the tossing mechanism further comprises a housing;

the housing has a receiving cavity, a top of the housing is provided with a feeding port communicating with the receiving cavity, a bottom of the housing is provided with a discharging hole in an inverted tapered structure, and the housing is further provided with a leaf distributing track; and the leaf distributing assembly comprises a first frame body, the leaf distributing belt, a leaf distributing belt driving assembly and a first frame body driving assembly. The leaf distributing belt driving assembly is disposed on the first frame body and configured to drive the leaf distributing belt to move. The first frame body driving assembly is configured to drive the first frame body to move back and forth along the leaf distributing track.

7. The system for fine manipulation according to claim 1, wherein: two setting mechanisms are provided, and the two setting mechanisms are respectively arranged to be close to two ends of the tossing machine; and the system for fine manipulation further comprises a leaf dividing conveyor mechanism, the leaf dividing conveyor mechanism comprises a connecting track, a second frame body, a leaf dividing belt, a leaf dividing belt driving assembly and a second frame body driving assembly, which are arranged on top of frames of the two setting mechanisms, the leaf dividing belt is configured to receive tea leaves falling from a conveyor belt of the second feeding conveyor assembly and convey the tea leaves to the setting belt of each of the two setting mechanisms, the leaf dividing belt driving assembly is disposed on the second frame body and configured to drive the leaf dividing belt to move, and the second frame body driving assembly is configured to drive the second frame body to move back and forth along the connecting track.

8. The system for fine manipulation according to claim 1, wherein the system for fine manipulation further comprises a light supplying system configured to provide illumination to tea leaves on the setting belt, and an air blowing system configured to blow air to the tea leaves on the setting belt.

9. The system for fine manipulation according to claim 1, wherein the system for fine manipulation further comprises a control system configured to control respective driving devices of the tossing mechanism, the setting mechanism and the leaf uniformly distributing mechanism to operate separately.

10. A method for fine manipulation, using the system for fine manipulation according to claim 1, the method for fine manipulation comprising following steps:

S1: activating the tossing mechanism, making an inlet and outlet port of the tossing machine face upwards and open, conveying sunned tea leaves into the tossing machine through the first feeding conveyor assembly, closing the inlet and outlet port, and performing a first tossing;

S2: activating the setting mechanism and the leaf uniformly distributing mechanism after the first tossing is finished, making the inlet and outlet port of the tossing machine face downwards and open, conveying firstly tossed tea leaves to the conveyor belt of the second feeding conveyor assembly and to the setting belt of the setting mechanism, distributing the firstly tossed tea leaves uniformly by the leaf uniformly distributing device, and performing a first setting;

S3: conveying set tea leaves from the setting belt to the conveyor belt of the first receiving conveyor assembly after the first setting is finished, and conveying the set tea leaves to the conveyor belt of the first feeding conveyor assembly and into the tossing machine; and performing a next tossing and a next setting in accordance with steps S1 and S2 sequentially, and performing a cycle of these steps repeatedly until the fine manipulation is finished.

\* \* \* \* \*